United States Patent
Baker

(10) Patent No.: US 6,469,984 B1
(45) Date of Patent: Oct. 22, 2002

(54) METHOD AND SYSTEM FOR MONITORING TRAFFIC ON A CODE DIVISION MULTIPLE ACCESS REPEATER

(75) Inventor: Kenneth R. Baker, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/339,152

(22) Filed: Jun. 24, 1999

(51) Int. Cl.[7] .............................................. H04B 7/14
(52) U.S. Cl. ...................................... 370/232; 370/315
(58) Field of Search ................................ 370/226, 243, 370/246, 252, 315, 335, 320, 342, 232, 233, 253

(56) References Cited

U.S. PATENT DOCUMENTS

| | | | |
|---|---|---|---|
| 5,794,153 A | | 8/1998 | Ariyavisitakul et al. .... 455/507 |
| 5,812,933 A | * | 9/1998 | Niki ............................. 455/16 |
| 5,822,312 A | | 10/1998 | Peach et al. ................. 370/323 |
| 5,838,671 A | * | 11/1998 | Ishikawa et al. ............. 370/335 |
| 5,859,838 A | | 1/1999 | Soliman ...................... 370/249 |
| 5,872,776 A | * | 2/1999 | Yang ........................... 370/342 |
| 6,049,535 A | * | 4/2000 | Ozukturk et al. ............ 370/335 |
| 6,115,368 A | * | 9/2000 | Schilling ..................... 370/335 |

FOREIGN PATENT DOCUMENTS

| | | | |
|---|---|---|---|
| EP | 0472018 | 7/1991 | ........... H04B/7/204 |
| EP | 0860952 | 2/1998 | ........... H04B/7/216 |
| WO | 9603845 | 2/1996 | ............ H04Q/7/38 |
| WO | 9733381 | 9/1997 | ............ H04B/7/15 |
| WO | 9844478 | 10/1998 | ............ G09G/3/20 |

OTHER PUBLICATIONS

Shinonaga, et al., Design of Multibeam Satellite Networks Realized by Subchannel Switched FDMA (SS/FDMA) System, Apr. 1993, Electronics and Communications in Japan, Part 1. pp. 79–91.

* cited by examiner

*Primary Examiner*—Wellington Chin
*Assistant Examiner*—Brenda Pham
(74) *Attorney, Agent, or Firm*—Russell B. Miller; Christopher Edwards

(57) ABSTRACT

The system monitors traffic on a CDMA repeater. The system receives a metric related to the operation of the CDMA repeater and automatically determines the amount of call traffic on the CDMA repeater based on the metric. The metric related to operation of the CDMA repeater could be the signal power from the CDMA repeater. The amount of the call traffic on the CDMA repeater could be measured by determining the number of users on the CDMA repeater. The number of users could be determined from a formula where the signal output is proportional to the number of users on the CDMA repeater. The system may also store or transmit to a remote location the metric or the amount of call traffic on the CDMA repeater.

38 Claims, 5 Drawing Sheets

METHOD AND SYSTEM FOR MONITORING TRAFFIC ON A CODE DIVISION MULTIPLE ACCESS REPEATER

BACKGROUND OF THE INVENTION

I. Field of the Invention

The present invention relates to the field of communications. More particularly, the present invention relates to a novel and improved method and system for monitoring traffic on a Code Division Multiple Access (CDMA) repeater.

II. Description of the Related Art

Wireless communication entails the transmission of electromagnetic waves through free space. In a wireless communication system, a base station exchanges wireless signals with a communication device, such as a mobile phone. A network of base stations provides wireless communication service to an expansive coverage area. Due to various geographic and economic constraints, the network of base stations does not provide communication services in certain areas within the coverage area. These holes in the coverage area are filled with the use of repeaters. Repeaters receive, amplify, and re-transmit signals to and from the communication device and base station. Typically, the repeater is a high gain bidirectional amplifier. The repeater provides communication service to the coverage hole, which was previously not serviced by the base station. Repeaters may also augment the coverage area of a sector by shifting the location of the coverage area or altering the shape of the coverage area. Repeaters play an integral role in providing wireless communication.

Monitoring call traffic is a key component in providing wireless communication. The amount of call traffic determines whether certain coverage areas need to upgrade or downgrade their communication equipment. High call volume over a repeater may signify the need to replace the repeater with a base station to better handle a large volume of traffic. However, there are no current solutions to automatically monitor the amount of traffic coming through the CDMA repeater in an accurate and efficient manner. CDMA base stations can monitor the amount of traffic on the base station through base station software. However, the base station software does not distinguish between calls coming in directly from the mobile phone and calls coming in from the repeater.

SUMMARY OF THE INVENTION

The present invention is a novel and improved system that solves the above problem by monitoring traffic on a CDMA repeater. The invention receives a metric related to CDMA repeater operations and determines the amount of call traffic on the CDMA repeater based upon the metric. Obtaining the traffic on the CDMA repeater provides a distinct advantage in network planning and architecture. Determining that the traffic over the CDMA repeater is too heavy would indicate the need to replace the CDMA repeater with the base station to provide better wireless communication service.

In one embodiment, the invention monitors the amount of the call traffic based on signal power of the CDMA repeater. A power meter reads the signal power of the CDMA repeater. The invention receives the signal power of the CDMA repeater from the power meter. The invention then determines the number of users on the CDMA repeater based on the signal power from the power meter. This determination is made by a formula where the signal power is proportional to the number of users on a CDMA repeater. The repeater measurement system may store the number of repeater users in memory or transmit the number of repeater users to a remote location.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
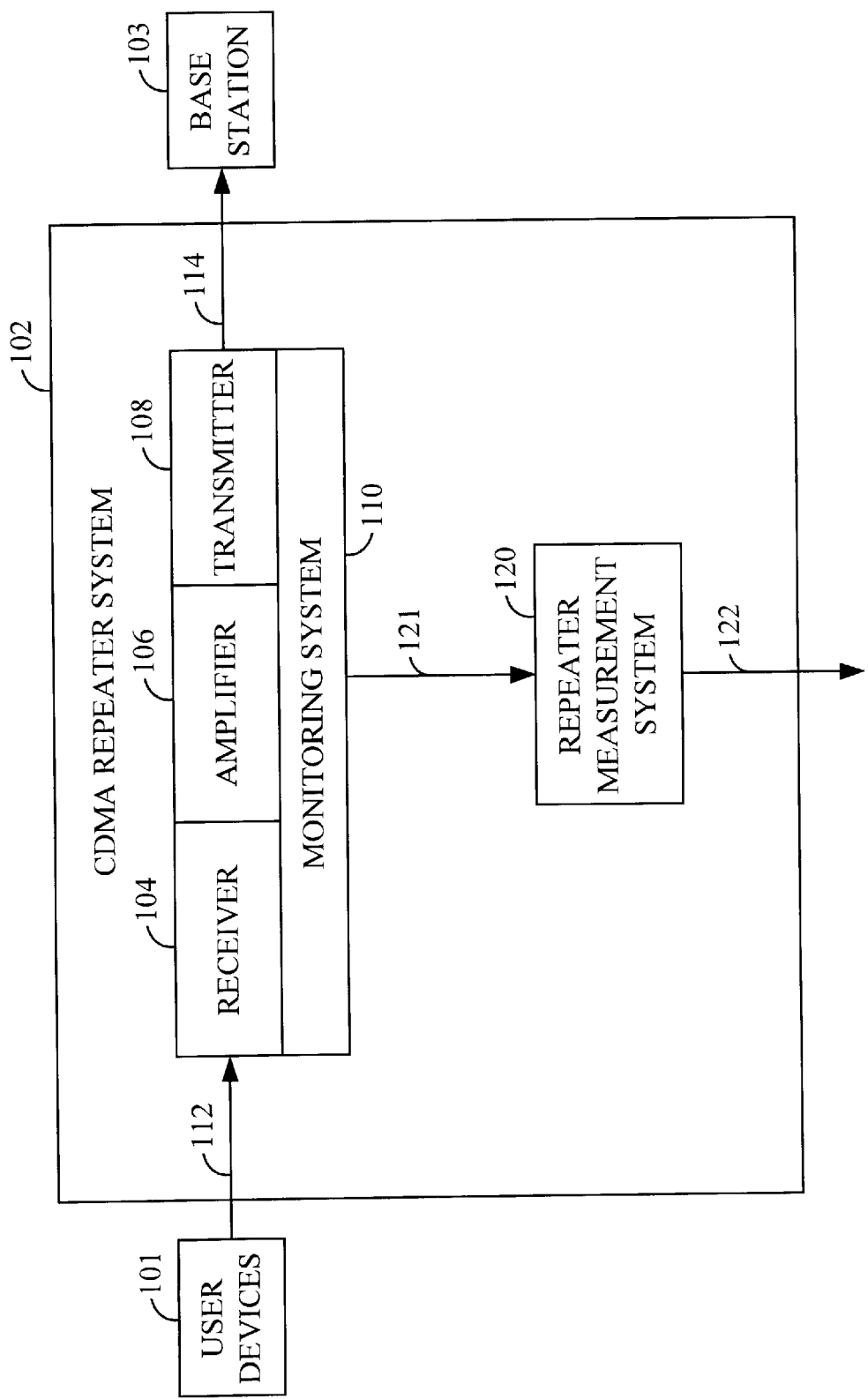
FIG. 1 is a block diagram of a CDMA communication system in an example of the invention.

CDMA Communication System—FIG. 1

FIG. 1 depicts a CDMA repeater system 102 in accord with the present invention. The CDMA repeater system 102 is comprised of a receiver 104, an amplifier 106, a transmitter 108, a monitoring system 110, an output link 121, a repeater measurement system 120, and an output link 122. The input CDMA signals 112 from user devices 101 are received by the receiver 104. The receiver 104 is connected to the amplifier 106. The amplifier 106 is connected to the transmitter 108. The transmitter 108 transmits the output CDMA signals 114 to a base station 103. In various alternative embodiments, the monitoring system 110 could be connected to the receiver 104, the amplifier 106, and/or the transmitter 108. The repeater measurement system 120 is connected to the monitoring system 110 by the output link 121 and to the output link 122. Those skilled in the art are aware that there are numerous other components and configurations that could be used for the repeater system of the present invention and that the invention is not restricted to the component and configurations depicted on FIG. 1. For example, repeaters typically include a communication path from base station 103 to user devices 101 that is omitted from FIG. 1.

In operation, the receiver 104 receives the input CDMA signals 112 and transfers the CDMA signals to the amplifier 106. The amplifier 106 receives the CDMA signals from the receiver 104, amplifies the CDMA signals, and transmits the amplified CDMA signals to the transmitter 108. The transmitter 108 receives the amplified CDMA signals from the amplifier 106 and transmits the amplified CDMA signals 114 to the base station 103. The monitoring system 110 can measure a metric from the receiver 104, the amplifier 106, and/or the transmitter 108. The monitoring system 110 then transmits the metric to the repeater measurement system 120 over the output link 121. An example of the monitoring system 110 is a power meter. The repeater measurement system 120 receives the metric from the monitoring system 110 and determines the amount of the call traffic on the CDMA repeater system 102 based on the metric.

The repeater measurement system could be co-located with the CDMA repeater (elements 104, 106, 108, and 110) or could be remotely located. The repeater measurement system 120 can transmit the amount of the call traffic over the output link 122. An example of the repeater measurement system 120 is a personal computer configured with software to support the invention.

In another embodiment of the invention, the repeater measurement system 120 receives the metric from the monitoring system 110 and determines a current power level indicative of the amount of call traffic on the CDMA repeater system 102 based on the metric. Additionally, the repeater measurement system 120 may determine whether the current power level exceeds a predetermined power level and transmit a signal in response to a positive determination that the current power level exceeds the predetermined power level. Alternatively, the repeater measurement system 120 may store in a memory the current power level.

Figure 2:
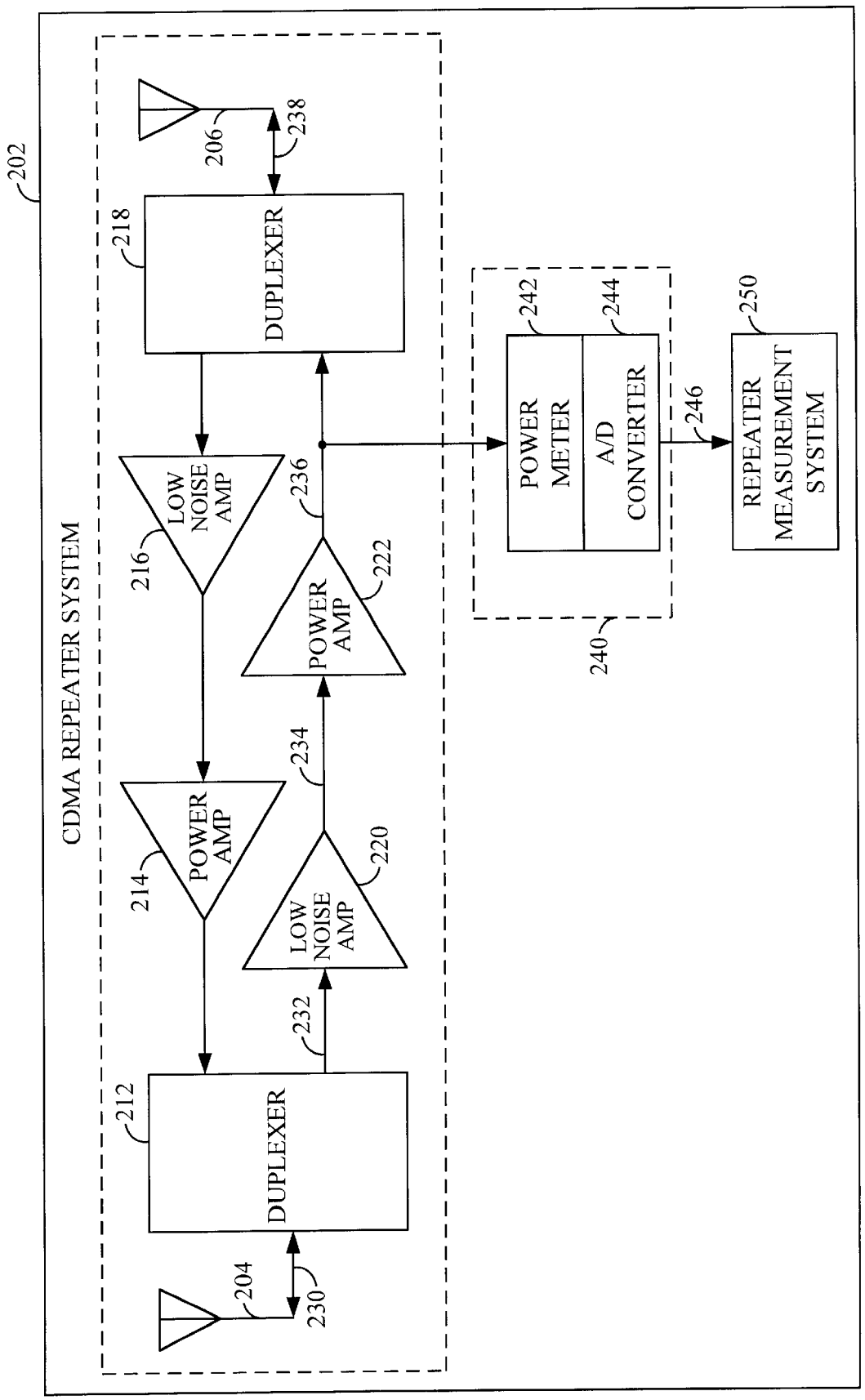
FIG. 2 is a block diagram of a CDMA communication system in an embodiment of the invention.
Figure 3:
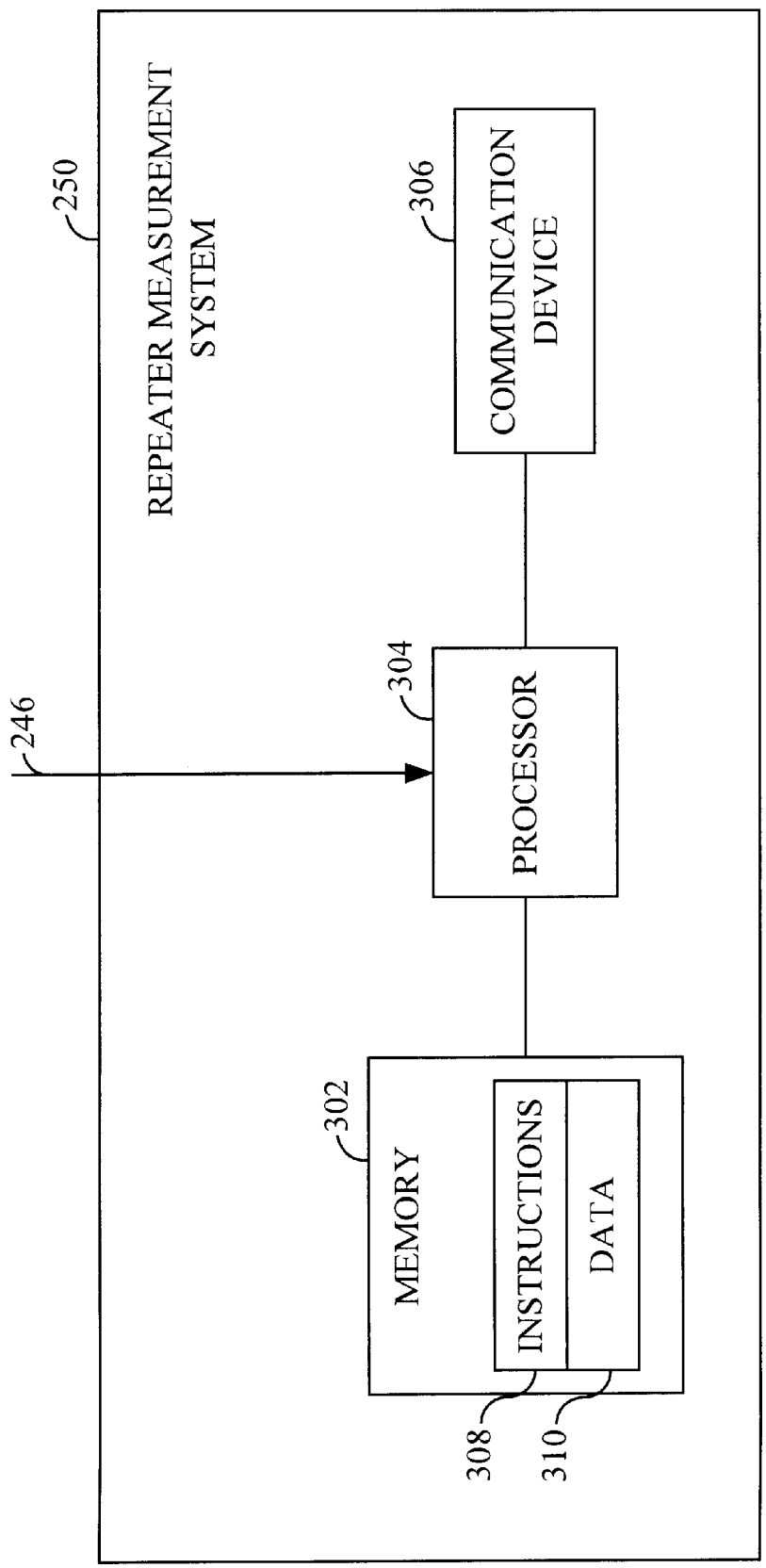
FIG. 3 is a block diagram of a repeater measurement system in an embodiment of the invention.

CDMA Repeater System—FIGS. 2–3

FIG. 2 depicts a CDMA repeater system 202 in one embodiment of the invention. The CDMA repeater system 202 is comprised of a CDMA repeater 210, a power monitoring system 240, and a repeater measurement system 250. The CDMA repeater 210 is comprised of a server antenna 204, a server antenna link 230, a duplexer 212, an input link 232, a low noise amplifier 220, an intermediate link 234, a power amplifier 222, an output link 236, a duplexer 218, a donor antenna link 238, a donor antenna 206, a low noise amplifier 216 and a power amplifier 214. The server antenna 204 is connected to the duplexer 212 by the server antenna link 230. The duplexer 212 is connected to the low noise amplifier 220 by the input link 232. The low noise amplifier 220 is connected to the power amplifier 222 by the intermediate link 234. The power amplifier 222 is connected to the duplexer 218 by the output link 236. The duplexer 218 is connected to the donor antenna 206 by the donor antenna link 238. The duplexer 218 is connected to the low noise amplifier 216. The low noise amplifier 216 is connected to the power amplifier 214. The power amplifier 214 is connected to the duplexer 212. The power monitoring system 240 is comprised of a power meter 242 and an analog/digital converter 244. The power meter 242 is connected to the output link 236 and the analog/digital converter 244. The analog/digital converter 244 is connected to the repeater measurement system 250 by output link 246. The antennas, duplexers, amplifiers, power meter, and analog/digital converter are conventional components, although they have not been combined to operate in accord with the invention.

In the forward operation, the donor antenna 206 receives a wireless CDMA signal from a base station. The donor antenna 206 transmits the received CDMA signal to the duplexer 218 through the donor antenna link 238. The duplexer 218 receives the CDMA signal and transmits the CDMA signal to the low noise amplifier 216. The low noise amplifier amplifies the CDMA signal from the duplexer 218 and transmits the CDMA signal to the power amplifier 214. The power amplifier 214 amplifies the CDMA signal from the low noise amplifier and transmits the CDMA signal to the duplexer 212. The duplexer 212 receives the CDMA signal and transmits the CDMA signal to the server antenna 204 through the server antenna link 230. The server antenna 204 receives the CDMA signal from the duplexer 212 and transmits a wireless CDMA signal to a communication device such as a mobile phone.

In the reverse operation, the server antenna 204 receives a wireless CDMA signal from a communication device such as a mobile phone. The server antenna 204 transmits the received CDMA signal to the duplexer 212 through the server antenna link 230. The duplexer 212 receives the received CDMA signal and transmits the received CDMA signal to the low noise amplifier 220 through the input link 232. The low noise amplifier 220 amplifies the CDMA signal from the duplexer 212 and transmits the CDMA signal to the power amplifier 222 through the intermediate link 234. The power amplifier 222 amplifies the CDMA signal and transmits the CDMA signal to the duplexer 218 through the output link 236. The duplexer 218 receives the CDMA signal from the power amplifier 222 and transmits the CDMA signal to the donor antenna 206 through the donor antenna link 238. The donor antenna 206 receives the CDMA signal from the duplexer 218 and transmits a wireless CDMA signal to the base station. This reverse operation comprises the reverse link of the CDMA repeater for communication from the mobile phone to the base station.

In this embodiment, the number of users on a CDMA repeater is calculated from the reverse operation of the CDMA repeater. The power meter 242 measures the output power over the output link 236. Other embodiments may measure the power from the CDMA repeater from the input link 232 and/or the intermediate link 234. The power from the CDMA repeater may also be measured from the server antenna link 230 or the donor antenna link 238 with the use of a filter. The power meter 242 then transmits the output power to an analog/digital converter 244. The analog/digital converter 244 receives the output power in analog form from the power meter 244 and converts the output power to digital form. The analog/digital converter 244 then transmits a metric signal over output link 246 indicating the output power in digital form to the repeater measurement system 250. In other embodiments the analog/digital converter may be included within the power meter 244 or the repeater measurement system 250. The repeater measurement system 250 then determines the number of users on the CDMA repeater 210 as described in FIG. 3.

FIG. 3 depicts the repeater measurement system 250. The repeater measurement system 250 is comprised of a memory 302, a processor 304, and a communication device 306. The processor 304 is connected to the output link 246, the memory 302 and a communication device 306. The memory 302 is a computer-readable medium that stores computer-executable instructions 308 and data 310.

The term "processor" could mean a single processing device or a plurality of inter-operational processing devices. Some examples of processors are computers, microprocessor chips, integrated circuits, and logic circuitry. The memory 302 is any conventional storage system that stores instructions 308 and data 310 for the processor 304. The communication device 306 is any communication device that transmits data for the processor 304.

In operation, the processor 304 executes instructions 308 stored in the memory 302 to determine the number of users on the CDMA repeater based on the digital signal representing the output power from the output link 246. The instructions 308 incorporate the following calculations.

In this embodiment, the output power can be shown by the equation 1.

$$S_O = \left(m_R \cdot \frac{q_R}{G_T} \cdot (1+i) \cdot N_O \cdot W + k \cdot T_R \cdot W\right) G_R \qquad [1]$$

where $S_O$=the signal output of a noisy repeater;
W=bandwidth of the CDMA signal;
$m_R$=number of full rate users of the radio channel of the repeater;

i=number of users heard at the repeater that are in other sectors;
$G_R$=gain of the repeater;
$G_T$=total link gain;
k=Boltzman's constant;
$T_R$=the excess noise temperature of the repeater
where:

$$T_R = T_O(Fr-1) \quad [2]$$

where $T_o$=the system noise temperature; and
Fr=the noise factor of the repeater=$10^{NF/10}_R$
where $Nf_R$=the noise figure of the repeater in dB;
$N_o = kT_o$=thermal noise density; and
$q_R$=normalized signal power at the BTS for a single user
where:

$$q_R = \frac{(1+j)}{\frac{W}{\frac{R}{E_b}} - m_R(1+i)} \quad [3]$$

where $j=N_j/N_o$=the normalized noise density of any jamming signals;
$N_j$=power density of any jammers impending upon the sector receiver;
$E_b/N_o$=bit energy to noise density level. This ratio is an average value per user; and
R=bit rate.

The number of full rate users of the repeater channel, $m_R$, can then be determined from Equation 1 as shown in Equation 4.

$$m_R = \frac{G_T \cdot \frac{W}{\frac{R}{E_b}}[S_O - k \cdot T_R \cdot W \cdot G_R]}{(1+j)(1+i) \cdot N_O \cdot W \cdot G_R + G_T(1+i)[S_O - k \cdot T_R \cdot W \cdot G_R]} \quad [4]$$

In Equation 4, the total link gain $G_T$ can be determined after the repeater is installed by totaling the gain of the repeater, the gain of the donor antenna on the repeater, the path loss between the repeater and the base station, and the gain of the base station antenna. The total link gain $G_T$ chosen at the time of installation is the operating point for the repeater. In this embodiment, the network engineer chooses an operating point such that the output signal power is proportional to the number of users on the repeater.

Figure 4:
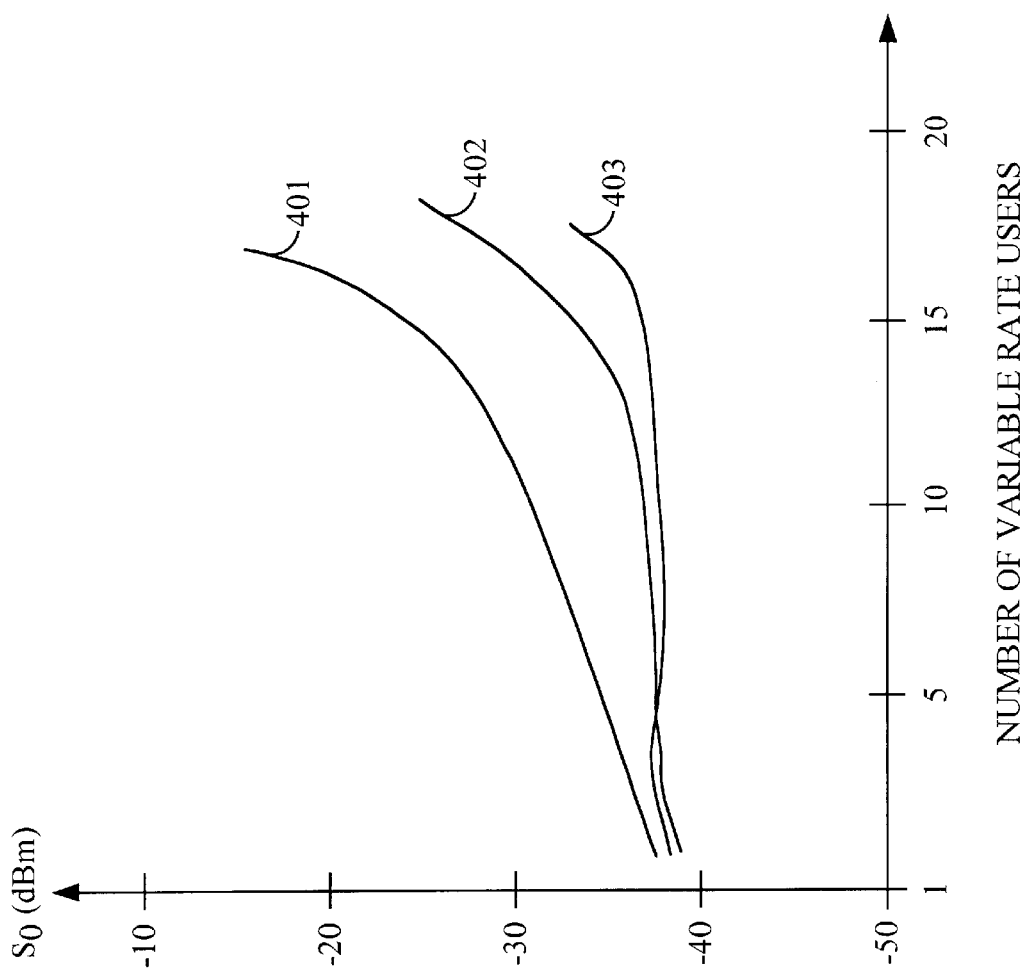
FIG. 4 illustrates a graph of the number of users on a repeater vs. the signal output power for a noisy repeater with a total link gain of −10 dB, 0 dB, and 10 dB in an embodiment of the invention.

FIG. 4 illustrate graphs for the number of repeater users vs. the output signal power for a noisy repeater for three different total link gains $G_T$ of −10 dB, 0 dB, and 10 dB. Repeaters are not noiseless devices. Thus, the noisy repeaters contribute noise to the signals that the repeater amplifies. The noisy repeater with a total link gain $G_T$ of −10 dB is shown by the line 401. The noisy repeater with a total link gain $G_T$ of 0 dB is shown by the line 402. The noisy repeater with a total link gain $G_T$ of 10 dB is shown by the line 403. FIG. 4 shows that when the total link gain $G_T$ is less than 1 dB, the signal output power will increase proportionally to the number of users on a repeater. A total link gain $G_T$ needs to be chosen so that the signal output power will increase proportionally to the number of users on a repeater in this embodiment. The total link gain $G_T$ varies depending upon the installation of the repeater. The total link gain $G_T$ should be preferably less than 0 dB so that the signal power output will increase proportionally to the number of users on the repeater.

The bandwidth of the CDMA signal W is a constant. An example of a bandwidth of the CDMA signal is 1.228 MHz. The bit rate R is also a constant. An example of a bit rate is 14.4 kbs. One skilled in the art may assume the bit energy to noise density ratio $E_b/N_o$ based on the typical performance for the coverage area. Alternatively, the bit energy to noise density ratio $E_b/N_o$ can be obtained from the most recent average value from the base station or mobile switching center software.

The excess noise temperature of the repeater $T_R$ can be derived from the the system noise temperature $T_o$ and the noise factor of the repeater Fr. One skilled in the art can assume the system noise temperature, $T_o$, such as 290K.

The noise factor of the repeater Fr can be derived from the noise figure of the repeater $Nf_R$ which can be measured after installation. The normalized noise density of any jamming signals j can be assumed by accounting for any jamming signals. The proportion of users i heard at the repeater that are in other sectors can also be assumed. This assumption may be based on the geographic territory and density of population near the sector.

The number of users, $m_R$, is expressed in terms of full rate users. Full rate users are users whose bit rate for human conversation through CDMA devices is not reduced due to gaps of silence in conversation. On the other hand, variable rate users are users whose bit rate for human conversation through CDMA devices is reduced due to voice coding to take advantage of gaps of silence in conversation. The number of full rate users can be used to calculate 30 the number of variable rate user as shown in Equation 5.

$$n = \frac{m_R}{v} \quad [5]$$

where n=number of variable rate users of the repeater;
$m_R$=the number of full rate users of the repeater; and
v=the voice activity factor.

The voice activity factor, v, for natural human conversation typically is 35%–40%.

Figure 5:
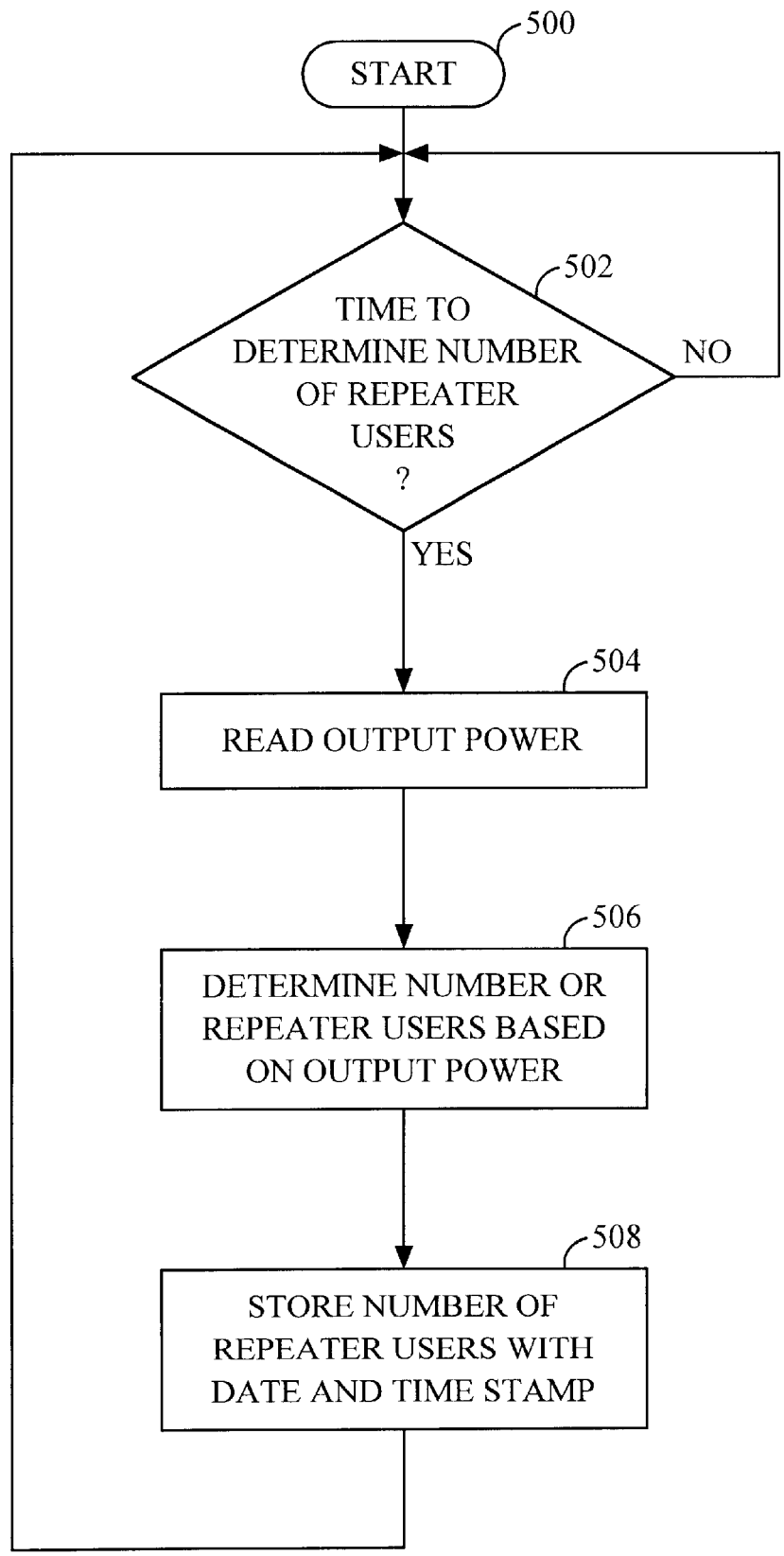
FIG. 5 is a flow chart of the repeater measurement system in an embodiment of the invention.

Flow Chart of Repeater Measurement System—FIG. 5

FIG. 5 depicts a flow chart illustrating the processor 304 operation when the instructions 308 stored in the memory 302 are executed. The process begins at step 500. At step 502, the processor 304 checks if the current time is a time to determine the number of repeater users. For example, time intervals can be set for every five minutes or every hour depending on how frequent the network engineer would like to monitor traffic over the repeater. If the current time does not match the time to determine, the processor 304 repeats step 502 until the current time does match. If the current time is a time to determine the number of repeater users, the processor 304 continues to step 504. At step 504, the processor 304 reads the metric signal from output link 246 indicating the signal output power in digital form from the power monitoring system 240. At step 506, the processor 304 then determines the number of users on the repeater 210 using Equation 4, as discussed above in FIG. 3, based on the metric signal from output link 246. At step 508, the processor 304 stores the number of users on the repeater 210 in the memory 302 with a date and time stamp. This information can be automatically provided or retrieved using the communication device 306. The processor 304 then returns to step 502 for the next time interval to determine the number of users.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for monitoring call traffic on a Code Division Multiple Access (CDMA) repeater, the method comprising:
   receiving a metric related to an operation of the CDMA repeater; and
   automatically determining an amount of call traffic on the CDMA repeater based on the metric; wherein the amount of call traffic determined on the CDMA device is based on total link gain of the repeater and is further based on a normalized signal power at a base station for a single user, a thermal noise density, and a bandwidth of a CDMA signal.

2. The method of claim 1 wherein determining the amount of call traffic on the CDMA repeater further comprises determining a number of users on the CDMA repeater.

3. The method of claim 2 wherein the metric is proportional to the number of users on the CDMA repeater.

4. The method of claim 2 wherein the metric is a power signal from a reverse link the CDMA repeater.

5. The method of claim 2 further comprising storing in a memory the number of users on the CDMA repeater.

6. The method of claim 2 further comprising transmitting to a remote location the number of users on the CDMA repeater.

7. The method of claim 2 wherein the users are full rate users on the CDMA repeater.

8. The method of claim 2 wherein the users are variable rate users on the CDMA repeater.

9. The method of claim 1 further comprising storing in a memory the amount of the call traffic on the CDMA repeater.

10. The method of claim 1 further comprising transmitting to a remote location the amount of the call traffic on the CDMA repeater.

11. The method of claim 1 wherein the normalized signal power at the base station for the single user is determined from a normalized noise density of any jamming signal, a bit energy to noise density level, a bit rate, and a proportion of users heard at the CDMA repeater in other sectors.

12. The method of claim 11 wherein automatically determining the amount of call traffic on the CDMA repeater is further based on the proportion of users heard at the CDMA repeater in other sectors.

13. The method of claim 12 wherein automatically determining the amount of call traffic on the CDMA repeater is further based on a Boltzman's Constant, the bandwidth of the CDMA signal, and the excess noise temperature of the CDMA repeater.

14. A computer-readable medium having computer-executable instructions for performing a method for monitoring traffic on a CDMA device, the method comprising:
   receiving a metric related to an operation of the CDMA device; and
   automatically determining an amount of call traffic on the CDMA device based on the metric; wherein the amount of call traffic determined on the CDMA device is based on total link gain of the repeater and is further based on a normalized signal power at a base station for a single user, a thermal noise density, and a bandwidth of a CDMA signal.

15. The computer-readable medium of claim 14 wherein determining the amount of call traffic on the CDMA device further comprises determining a number of users on the CDMA repeater.

16. The computer-readable medium of claim 15 wherein the metric is proportional to the number of users on the CDMA repeater.

17. The computer-readable medium of claim 16 wherein the metric is a power signal from a reverse link of the CDMA repeater.

18. The computer-readable medium of claim 15 wherein the method further comprises storing in a memory the number of users on the CDMA repeater.

19. The computer-readable medium of claim 15 wherein the method further comprises transmitting to a remote location the number of users on the CDMA repeater.

20. The computer-readable medium of claim 15 wherein the users are full rate users on the CDMA repeater.

21. The computer-readable medium of claim 15 wherein the users are variable rate users on the CDMA repeater.

22. The computer-readable medium of claim 14 wherein the method further comprises storing in a memory the amount of the call traffic on the CDMA device.

23. The computer-readable medium of claim 14 wherein the method further comprises transmitting to a remote location the amount of the call traffic on the CDMA repeater.

24. The computer-readable medium of claim 14 wherein the normalized signal power at the base station for the single user is determined from a normalized noise density of any jamming signal, a bit energy to noise density level, a bit rate, and a proportion of users heard at the CDMA device in other sectors.

25. The computer-readable medium of claim 24 wherein automatically determining the amount of call traffic on the CDMA device is further based on the proportion of users heard at the CDMA device in other sectors.

26. The computer-readable medium of claim 25 wherein automatically determining the amount of call traffic on the CDMA device is further based on a Boltzman's Constant, the bandwidth of the CDMA signal, and the excess noise temperature of the CDMA device.

27. A Code Division Multiple Access (CDMA) repeater system comprising:
   a receiver configured to receive CDMA signals and transmit CDMA signals;
   an amplifier configured to receive CDMA signals from the receiver, amplify CDMA signals, and transmit CDMA signals;
   a transmitter configured to receive CDMA signals from the amplifier and transmit CDMA signals; and
   a repeater measurement system configured to receive a metric related to an operation of the CDMA repeater and to automatically determine an amount of call traffic on the CDMA repeater based on the metric; wherein the repeater measurement system configured to determine the amount of call traffic on the CDMA repeater comprises logic to determine the number of users on the CDMA repeater and is further based on a gain of:the repeater, a total link gain, a normalized signal power at a base station for a single user, a thermal noise density and a bandwidth of a CDMA signal.

28. The CDMA repeater system of claim 27 wherein the metric is proportional to the number of users on the CDMA repeater.

29. The CDMA repeater system of claim 28 wherein the metric is a power signal from a reverse link of the CDMA repeater.

30. The CDMA repeater system of claim 28 wherein the repeater measurement system is further configured to store in a memory the number of users on the CDMA repeater.

31. The CDMA repeater system of claim 28 wherein the repeater measurement system is further configured to transmit to a remote location the number of users on the CDMA repeater.

32. The CDMA repeater system of claim 28 wherein the users are full rate users on the CDMA repeater.

33. The CDMA repeater system of claim 28 wherein the users are variable rate users on the CDMA repeater.

34. The CDMA repeater system of claim 27 wherein the repeater measurement system is further configured to store in a memory the amount of the call traffic on the CDMA repeater.

35. The CDMA repeater system of claim 27 wherein the repeater measurement system is further configured to transmit to a remote location the amount of the call traffic on the CDMA repeater.

36. The CDMA repeater system of claim 27 wherein the normalized signal power at the base station for the single user is determined from a normalized noise density of any jamming signal, a bit energy to noise density level, a bit rate, and a proportion of users heard at the CDMA repeater in other sectors.

37. The CDMA repeater system of claim 36 wherein the repeater measurement system configured to determine the amount of call traffic on the CDMA repeater is further based on the proportion of users heard at the CDMA repeater in other sectors.

38. The CDMA repeater system of claim 37 wherein the repeater measurement system configured to determine the amount of call traffic on the CDMA repeater is further based on a Boltzman's Constant, the bandwidth of the CDMA signal, and the excess noise temperature of the CDMA repeater.

* * * * *